(12) United States Patent
Kobos et al.

(10) Patent No.: US 9,599,394 B2
(45) Date of Patent: Mar. 21, 2017

(54) REFRIGERATOR, FREEZER AND ICEMAKER GAP GAUGES

(71) Applicant: WHIRLPOOL CORPORATION, Benton Harbor, MI (US)

(72) Inventors: Duane M. Kobos, LaPorte, IN (US); Todd J. Tunzi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 162 days.

(21) Appl. No.: 14/675,831

(22) Filed: Apr. 1, 2015

(65) Prior Publication Data

US 2016/0290709 A1    Oct. 6, 2016

(51) Int. Cl.

| | |
|---|---|
| G01B 5/25 | (2006.01) |
| F25D 23/10 | (2006.01) |
| B23P 19/00 | (2006.01) |
| F25D 23/02 | (2006.01) |
| F25D 23/06 | (2006.01) |
| E05D 11/00 | (2006.01) |
| F25D 25/02 | (2006.01) |
| B01D 35/02 | (2006.01) |

(52) U.S. Cl.
CPC ............. *F25D 23/10* (2013.01); *B01D 35/02* (2013.01); *B23P 19/00* (2013.01); *E05D 11/0054* (2013.01); *F25D 23/028* (2013.01); *F25D 23/062* (2013.01); *F25D 23/069* (2013.01); *F25D 25/024* (2013.01)

(58) Field of Classification Search
CPC ...... F25D 23/10; F25D 23/028; F25D 23/062; F25D 23/069; F25D 25/024; B23P 19/00; E05D 11/054; B01D 35/02

USPC ........................................... 33/567, 613, 645
See application file for complete search history.

(56) References Cited

U.S. PATENT DOCUMENTS

| | | | | |
|---|---|---|---|---|
| 5,551,162 | A * | 9/1996 | Struble | G01B 5/14 33/544.4 |
| 7,415,984 | B2 * | 8/2008 | Flowers | A47L 15/4263 134/200 |
| 2008/0066481 | A1 * | 3/2008 | An | F25D 23/028 62/265 |
| 2012/0286632 | A1 * | 11/2012 | Wilson | F25D 23/10 312/204 |
| 2014/0210331 | A1 * | 7/2014 | Tunzi | F25D 25/00 312/404 |
| 2014/0217871 | A1 * | 8/2014 | Kerner | F25D 25/024 312/236 |
| 2014/0265808 | A1 * | 9/2014 | Kendall | F25D 27/00 312/408 |
| 2016/0278519 | A1 * | 9/2016 | Seeley | A47B 57/32 |

(Continued)

*Primary Examiner* — G. Bradley Bennett

(57) ABSTRACT

An example functional member of a refrigerator, freezer or icemaker having two closing members intended to be separated by a first distance includes a structure to implement a function for the refrigerator, freezer or icemaker, and a gap gauge dimensioned for use in aligning the two closing members apart by the first distance. An example functional member is a divider, a hinge cover or a scoop having a gap gauge with a blade-shaped, an oval or a rectangular cross-section, where a dimension of the cross-section is the first distance. An example gap gauge may be further dimensioned for use in aligning one of the two closing members and a third closing members, or two additional closing members apart by a second different distance.

20 Claims, 13 Drawing Sheets

(56) References Cited

U.S. PATENT DOCUMENTS

2016/0290707 A1* 10/2016 Burke .................. F25D 23/028

* cited by examiner

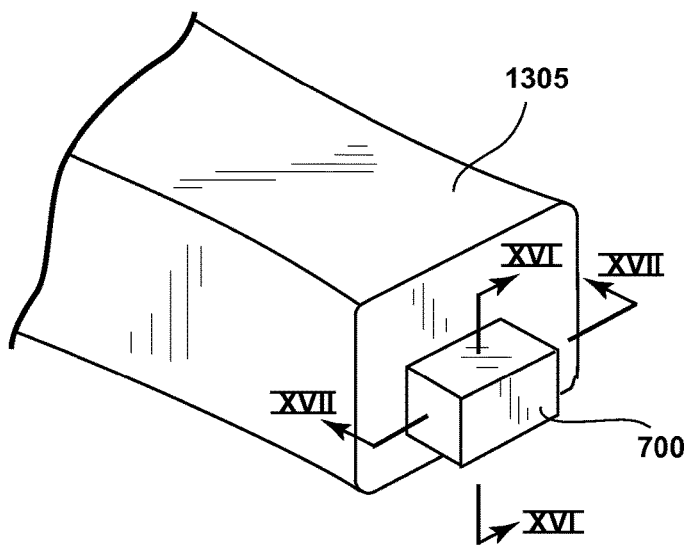
FIG. 15
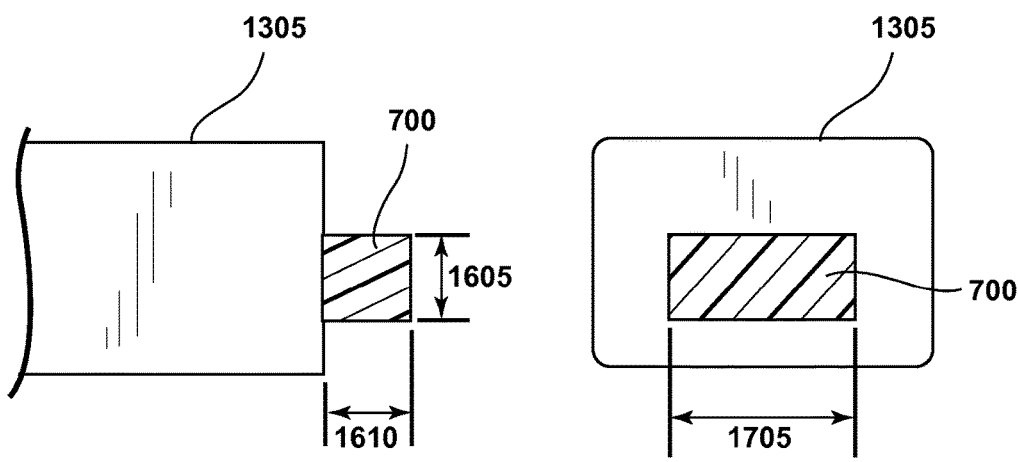
FIG. 16　　　　FIG. 17

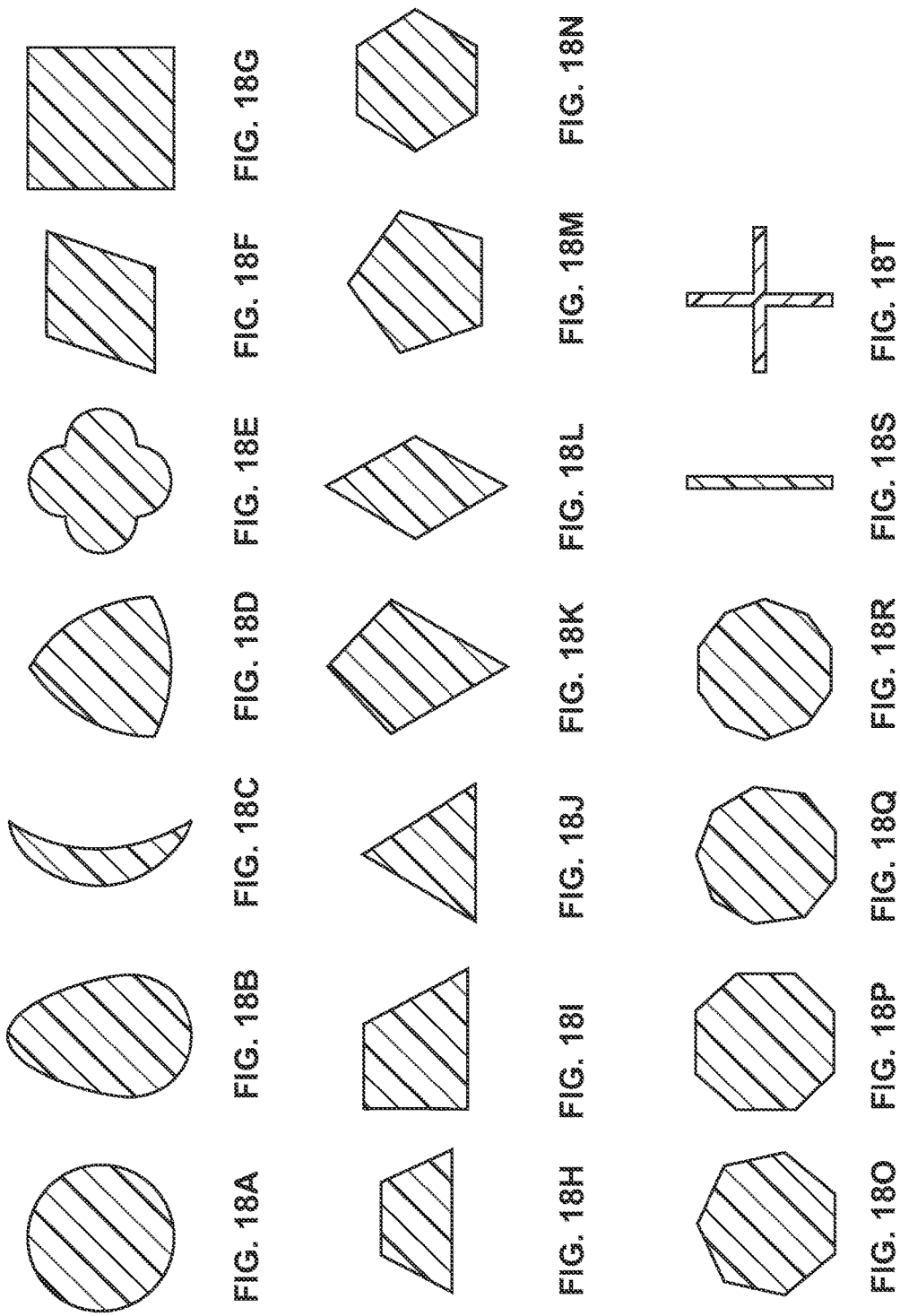

REFRIGERATOR, FREEZER AND ICEMAKER GAP GAUGES

FIELD OF THE DISCLOSURE

This disclosure relates generally to refrigerators, freezers and icemakers, and, more particularly, to refrigerator, freezer and icemaker gap gauges.

BACKGROUND

Many refrigerators, freezers and icemakers have one or more doors and/or drawers that are moveably mounted for movement between opened and closed positions to selectively open and close storage compartments. The doors and/or drawers are typically separated from each other forming a gap.

SUMMARY

An example functional member of a refrigerator, freezer or icemaker having two closing members intended to be separated by a first distance includes a structure to implement a function for the refrigerator, freezer or icemaker, and a gap gauge dimensioned for use in aligning the two closing members apart by the first distance. An example functional member is a divider, a hinge cover or a scoop having a gap gauge with a blade-shaped, an oval or a rectangular cross-section, where a dimension of the cross-section is the first distance. An example gap gauge may be further dimensioned for use in aligning one of the two closing members and a third closing members, or two additional closing members apart by a second different distance.

BRIEF DESCRIPTION OF THE DRAWINGS

FIG. 15 is a perspective view of an example rectangular gap gauge constructed in accordance with the teachings of this disclosure.

FIGS. 16 and 17 are cross-section views of the example rectangular gap gauge of FIG. 15.

FIGS. 18A-T are cross-section views of additional example gap gauges.

DETAILED DESCRIPTION

Figure 1:
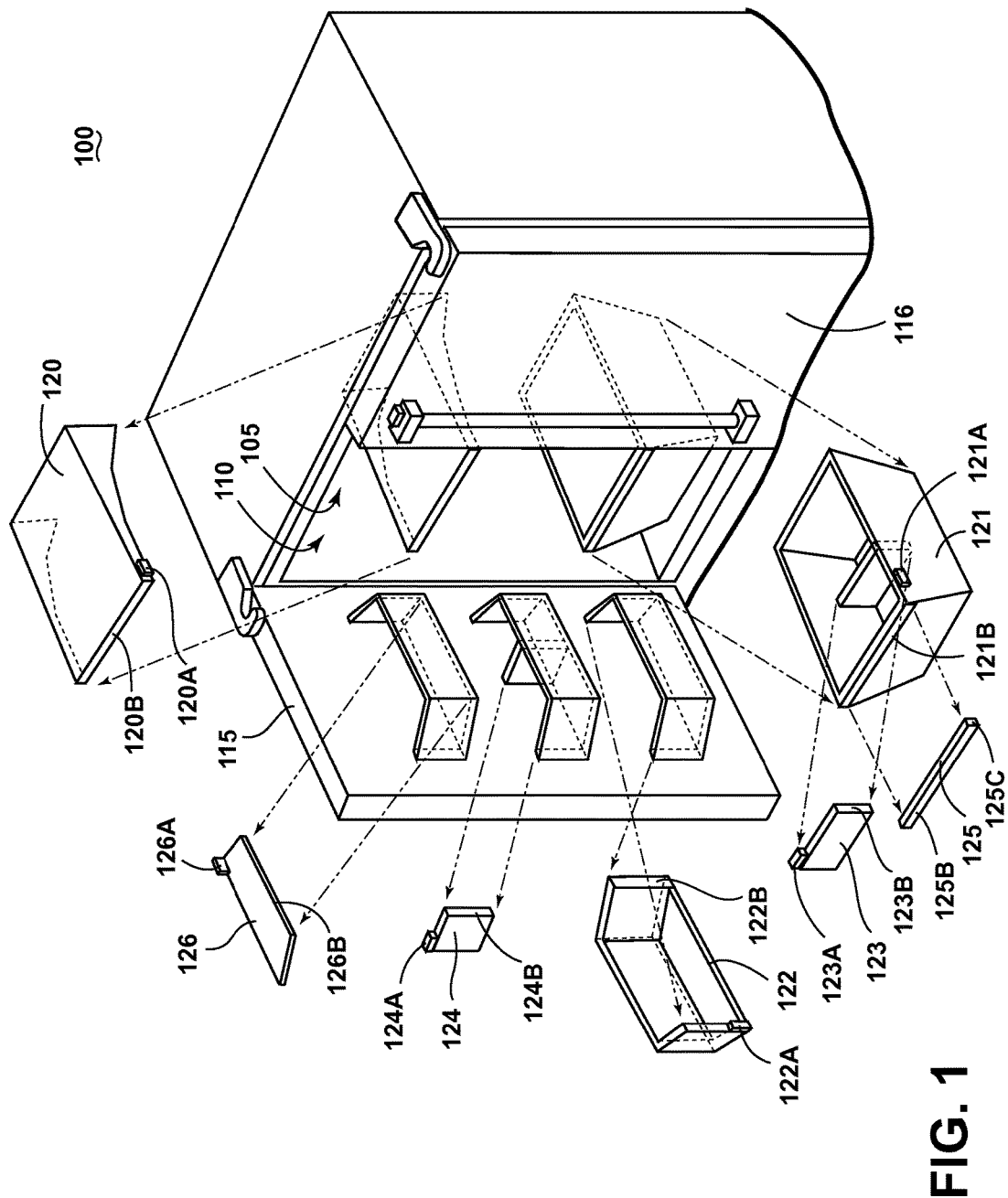
FIG. 1 is an isometric perspective view of a portion of an example refrigerator showing example functional members having gap gauges constructed in accordance with the teachings of this disclosure.

For ease of discussion, the gap gauges disclosed herein are shown and described in connection with example refrigerators. However, it should be understood that the disclosed gap gauges are also applicable to freezers and icemakers. Moreover, while example refrigerator configurations are shown, the gap gauges disclosed herein may be implemented in connection with any number and/or type(s) of other refrigerator configuration(s). Example refrigerator configurations include, but are not limited to, a side-by-side refrigerator, a top-freezer refrigerator, a French-door refrigerator, a bottom-freezer refrigerator, etc. Furthermore, the gap gauges disclosed herein may be used with other domestic appliances having gaps that may benefit from alignment.

Alignment of closing members, such as doors and/or drawers, of a refrigerator refers to the adjustment of doors and/or drawers so that a generally uniform gap of a desired distance is present between adjacent doors and/or drawers. Alignment can be problematic for consumers, movers and/or installers during installation, moving and/or long-term use of a refrigerator. For example, the consumer, mover or installer may need to remove the doors and/or drawers of a refrigerator to move the refrigerator through doorways and/or down hallways. When the doors and/or drawers are reattached, the consumer, mover or installer may have difficulty in reestablishing satisfactory and/or consistent spaces or gaps between the doors and/or drawers on multi-door and/or drawer products, such as a French-door bottom mounted freezer unit that has a door gap located on the prominent, central axis of the refrigerator. Market trends toward refrigerators with more doors and/or drawers (i.e., more gaps); and produced with thicker, heavier doors (i.e., harder to handle on installation) increase the need for gap gauges that enable the consumer, mover or installer to accurately and easily (re-)align gaps. In addition, reduced cabinet rigidity (sometimes intentional) and/or uneven floors in consumer homes or places of business may combine and cause consumers to want or need to adjust their doors and/or drawers, even if they were not removed.

Current solutions are generally ineffective. Instruction sheets can help the consumer, mover or installer perform an alignment, when those sheets are referred to or retained by the consumer, mover or installer. Packaging material that fits in door and/or drawer gaps during shipping may be used as a gap gauge. However, packaging material is often discarded during the initial set up, and even if retained, it is typically made from crushable polystyrene foam that may not retain the gap dimension and may be easily damaged. Additionally, manufacturers of refrigerators may prefer not to ship products with packaging materials in door gaps, as this material may rub against the door faces during transportation and produce a wear mark on the refrigerator door. A consumer service call to align doors is costly, time consuming, and undesirable for both consumer and manufacturer.

To overcome at least these problems, functional members of a refrigerator that implement a function during operation of the refrigerator, and that also implement a gap gauge for door and/or drawer alignment are disclosed. By implementing a gap gauge as part of a functional member, which is intended to and will normally be retained by the consumer together with the refrigerator, the consumer or a future mover will still have the gap gauge ready available to re-align doors and/or drawers, even many years later. As shown and described below, a gap gauge can be readily added to or implemented by a functional member of the refrigerator, thereby enabling the gap gauge to be economically made and provided to the consumer. Accordingly, a gap gauge is not provided as a separate member that may be inadvertently misplaced or discarded. In general, a gap gauge will have a dimension that allows two doors and/or drawers to be aligned with a particular separation. In some examples, a gap gauge may have an additional different dimension (e.g., be a rectangle) that allows gaps of two different separations to be aligned. As will be shown and discussed below, a gap gauge may be implemented with any number of ornamental and/or decorative shapes. For example, a square and a circle both could be used to enable gap alignment of a single distance; and a rectangle and an oval both could be used to enable gap alignment of two different distances. Accordingly, the selection of the ornamental and/or decorative shape of a gap gauge is a matter of design aesthetics, even while its size is selected based on intended gap sizes.

While in some of the examples shown in the attached figures a gap gauge is shown as centered on a surface, the gap gauge may be offset vertically or horizontally. Such offsets may be used for aesthetic reasons, for manufacturing reasons, etc. Further, while the gap gauges are generally shown herein with sharp corners, it is to be understood that such edges may be rounded for aesthetic reasons, for manufacturing reasons, etc. Moreover, a gap gauge may also be a dimension of a member (e.g., thickness of a divider or a dimension of a brace) selected to correspond to a gap to be aligned. Furthermore, a portion of a functional member may be tapered to form a gap gauge.

In additional to having a gap gauge, the functional members disclosed herein have one or more features, shapes, members, components or any other structure that implements a function for a refrigerator. Example functions include, but are not limited to, a covering function, a holding function, a dividing function, a supporting function, and/or a decorative function. For example, a functional member in the form of a divider may have a relatively thin rectangular shape or structure with ends that allow the divider to be movably positioned between, for example, two sides of a drawer to divide a compartment. Persons of skill in the art will readily know the plurality of functional members and their associated structures that may be a part of a refrigerator.

The example gap gauges disclosed herein provide multiple benefits compared to the prior art. For example, many functional members of a refrigerator are formed of plastic or vinyl, which are rigid enough to maintain their dimension(s) for use as a gap gauge, as compared to Styrofoam™, cardboard or corrugated fiberboard packing materials. Despite their rigidity, such materials are softer in surface hardness than door construction materials, preventing damage to the door during use. Furthermore, because they are part of a functional member, the gap gauges disclosed herein are provided with a ready storage location (the location in which the functional member is placed, installed, used, etc.), which reduces loss or misplacement of the gap gauge. That is, the disclosed gap gauges will naturally be retained as part of the refrigerator during the normal performance of their primary function, and thus will continue to be available as gap gauges for, in many instances, the useable life of the refrigerator.

In view of the instant application, persons of ordinary skill in the art will readily understand that the phrase "functional member" refers to any operative or decorative, removably attached or moveable, article, element, part, component, cover, support, mount, housing, or any other member of a refrigerator, freezer or icemaker. A functional member performs a function for the refrigerator, freezer or icemaker, and is intended to remain a part of the refrigerator, freezer or icemaker after the refrigerator, freezer or icemaker is delivered, moved, put in service, etc. In some examples, a functional member may be a member intended for replacement, such as a filter. Functional member expressly excludes packing, shipping, installation, etc. materials that are intended for disposal rather than to remain with the refrigerator, freezer or icemaker after the refrigerator, freezer or icemaker is delivered, moved, put in service, etc. While example functional members are shown and described herein, it should be understood that any other known or future functional member(s) of a refrigerator, freezer or icemaker may include or implement a gap gauge in accordance with the teachings of this disclosure. As used herein, "removably attached" means an article, element, part, component, cover, support, mount, housing, or any other member that is reversibly attached in a way that is intended by design for removal by hand or using a hand tool, without damage to the refrigerator, freezer and/or the removed member.

FIG. 1 illustrates a portion of an example refrigerator 100 having a compartment 105 having an open face 110, and two doors (i.e., closing members) 115 and 116 moveably mounted for movement between opened and closed positions to selectively open and close the open face 110 of the refrigerator 100.

To facilitate storages of items in the compartment 105, the example compartment 105 of FIG. 1 includes one or more shelves that may be moveably positionable within the compartment 105 to allow for flexible storage of items in the compartment 105 (one of which is designated at reference numeral 120); one or more drawers that move in and out of the compartment 105 so items may be placed in or removed from the drawers (one of which is designated at reference numeral 121); and one or more door bins that may be removably or fixedly mounted to a door 115, 116 (one of which is designated at reference numeral 122). To enable the drawers 121 and/or bins 122 to be divided, the refrigerator 100 may include dividers, two of which are designated at reference numerals 123 and 124. As shown, the drawers 121 may include a removable handle 125, and the bins 122 may include a removable mat 126. As is well known, the functional members 120-126 have a structure that allows them to implement a decorative or functional function.

As shown in the example of FIG. 1, one or more of the functional members 120-126 may include a respective gap gauge 120A-124A, 126A that extends from the structure of its respective member(s) 120-126. Additionally or alternatively, a gap gauge may be a dimension or cross-section of a functional member 120-126, examples of which are designated at reference numerals 120B, 121B, 122B, 123B, 124B, 125B, 125C, and 126B. A refrigerator may include more than one of the example gap gauges of FIG. 1 to provide gap gauges for different closing member separation distances. Moreover, while the functional members 120-126 are shown as having multiple gap gauges, any of the functional members 120-126 may implement only one gap gauge. Furthermore, while multiple functional members 120-126 are shown as having gap gauges, fewer (e.g., one) of the functional members 120-126 may implement one or more gap gauges. Further still, as discussed below, a gap gauge may have more than one dimension that may be used as a gap gauge for different closing member separation distances.

Figure 2:
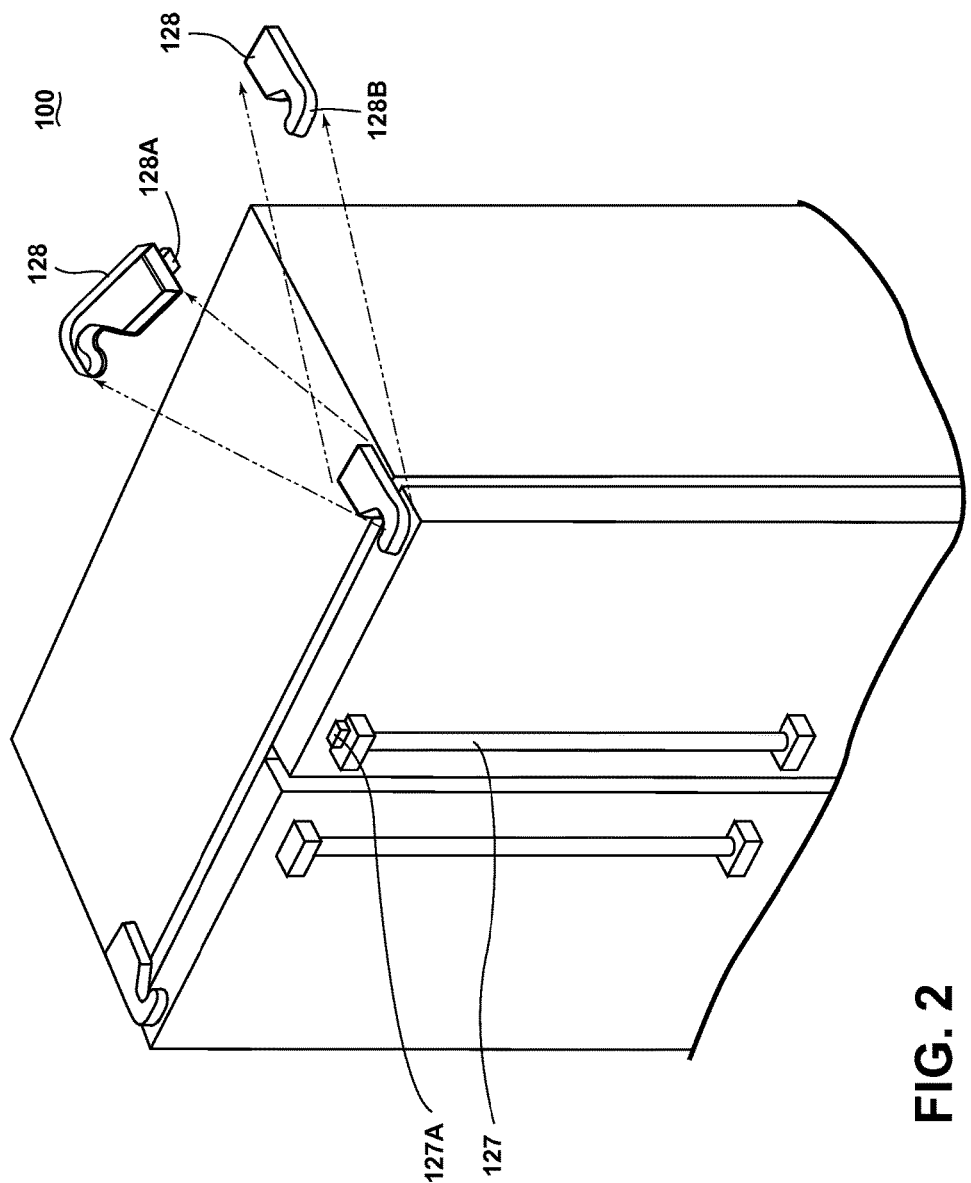
FIG. 2 is an isometric perspective view of a portion of the example refrigerator of FIG. 1 showing additional example functional members having gap gauges constructed in accordance with the teachings of this disclosure.

FIG. 2 shows additional example functional members, a handle 127 and a hinge cover 128, of the example refrigerator 100 that may include or implement gap gauges 127A, 128A and 128B.

Figure 3:
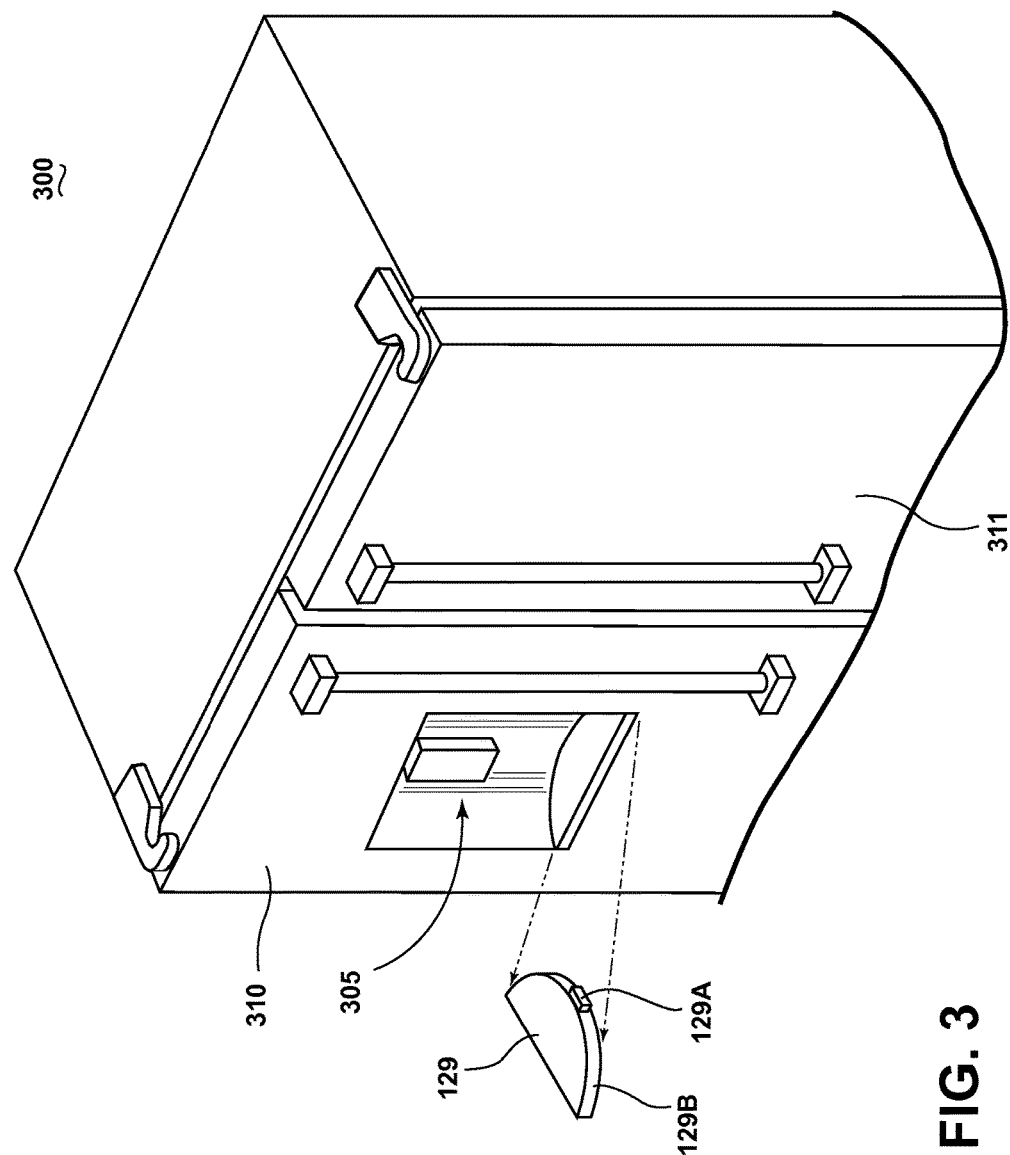
FIG. 3 is an isometric perspective view of a portion of another example refrigerator showing another example functional member having one or more gap gauges constructed in accordance with the teachings of this disclosure.

FIG. 3 shows a portion of another example refrigerator 300 having a dispenser 305 on one of its doors 310, 311. As shown, a functional member in the form of a drip tray 129 can implement an extending gap gauge 129A and/or a gap gauge 129B in the form of a dimension or cross-section of the drip tray 129.

Figure 4:
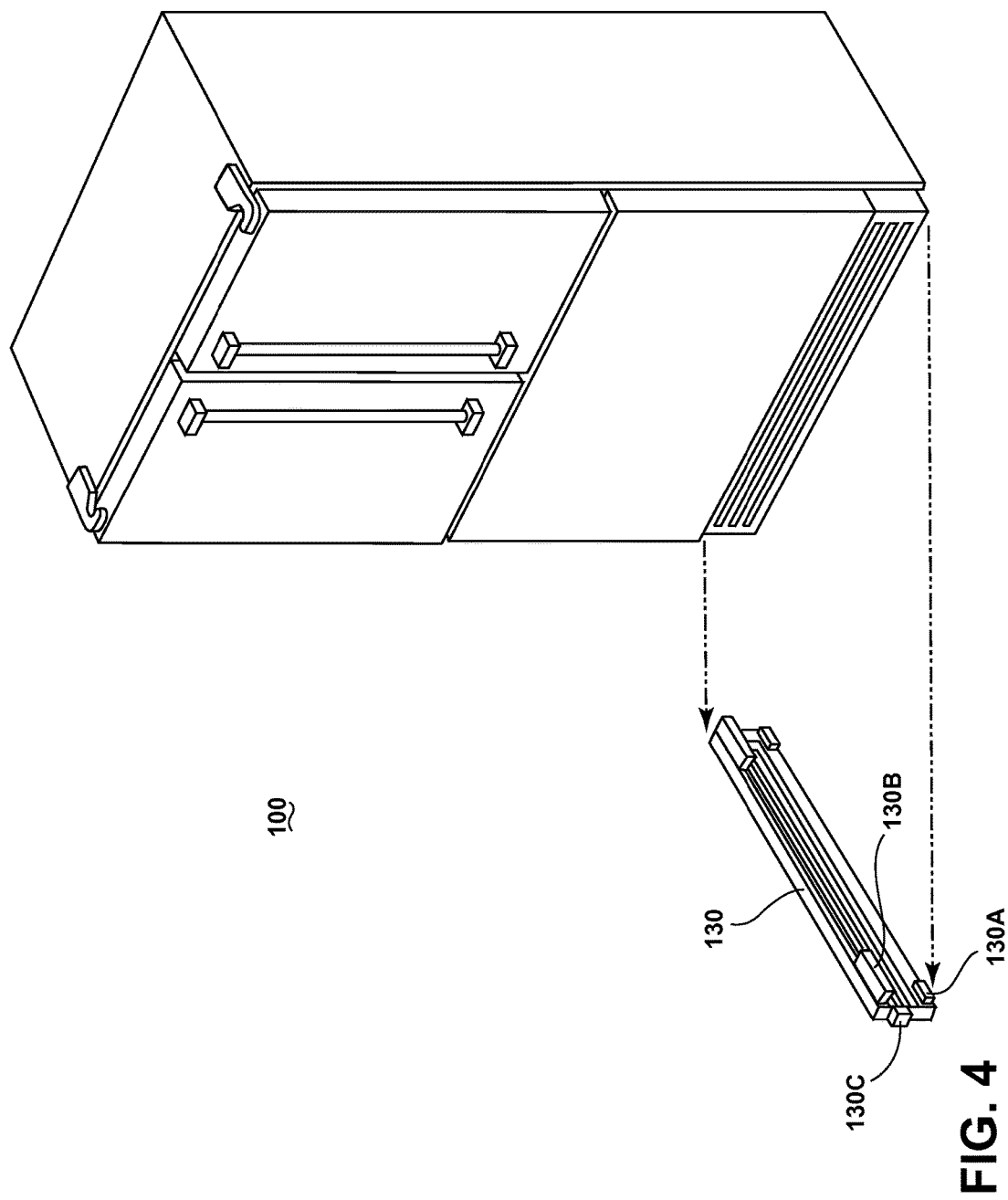
FIG. 4 is an isometric perspective view of another example refrigerator showing still another example functional member having one or more gap gauges constructed in accordance with the teachings of this disclosure.

FIG. 4 shows a larger portion the example refrigerator 100 having a functional member in the form of a kick plate 130 implementing one or more gap gauges 130A, 130B on a backside of the kick plate 130, or a gap gauge 130C extending from an end of the kick plate 130. In some examples, the gap gauges 130A, 130B may be structures of the kick plate 130 that hold the kick plate 130 to the refrigerator 100.

Figure 6:
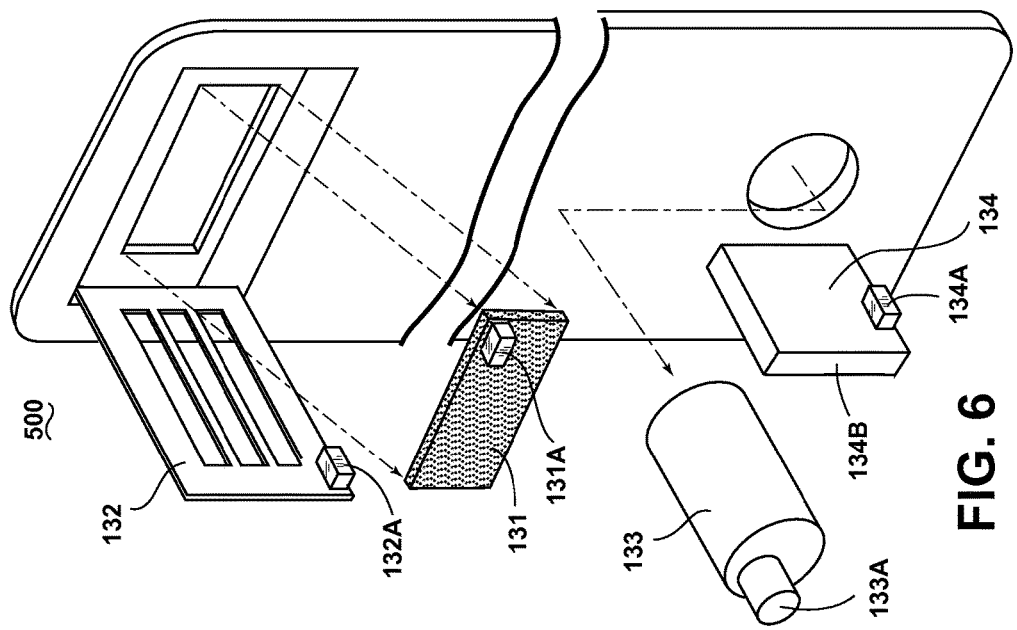
FIGS. 5 and 6 are isometric perspective views of an interior portion of any of the example refrigerator of FIGS. 1-4 showing still more example functional members having gap gauges constructed in accordance with the teachings of this disclosure.
Figure 5:
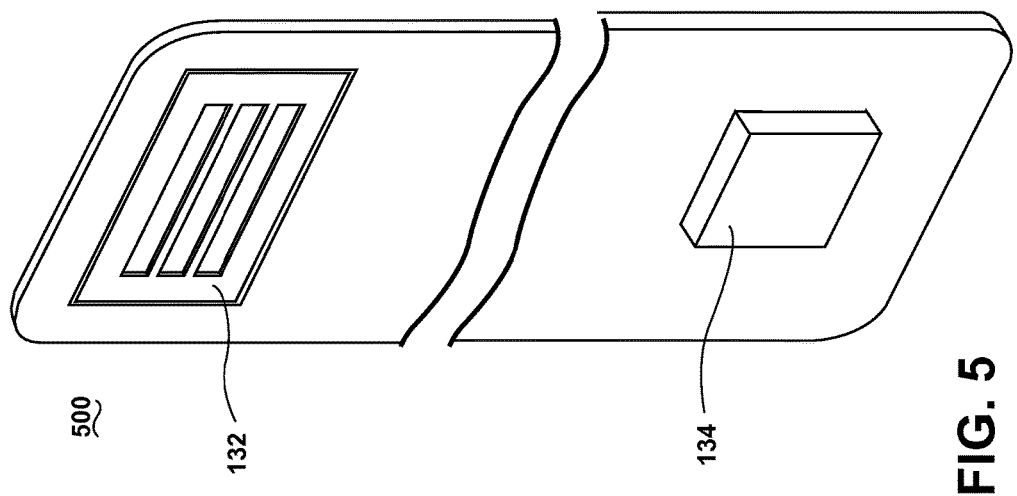

FIGS. 5 and 6 show a portion of an interior 500 of a refrigerator, such as the refrigerators of FIGS. 1-4. An upper part of the interior 500 includes functional member in the form of an air filter 131 behind another functional member in the form of a door 132; and a yet another functional member in the form of a water filter 133 behind still another functional member in the form a water filter housing member 134. As shown in FIG. 6, the functional members 131-134 may include a respective extending gap gauge 131A-134A. Additionally, a dimension or cross-section of the members 131-134 may implement a gap gauge, one of which is designated at reference numeral 134B.

Figure 7:
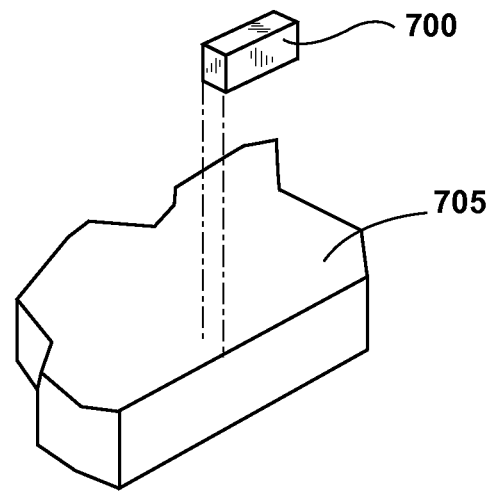
FIGS. 7 and 8 illustrate two example gap gauges included or implemented by any functional member of a refrigerator, freezer or icemaker.
Figure 8:
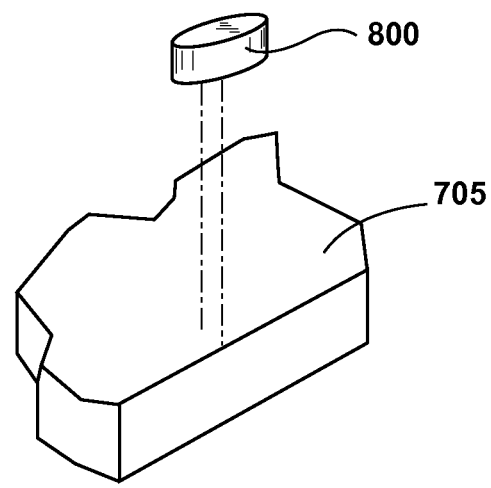

FIGS. 7 and 8 respectively show a rectangular gap gauge 700 and an oval gap gauge 800 extending from any functional member 705, such as, but not limited to, the example functional members of FIGS. 1-6.

Figure 9:
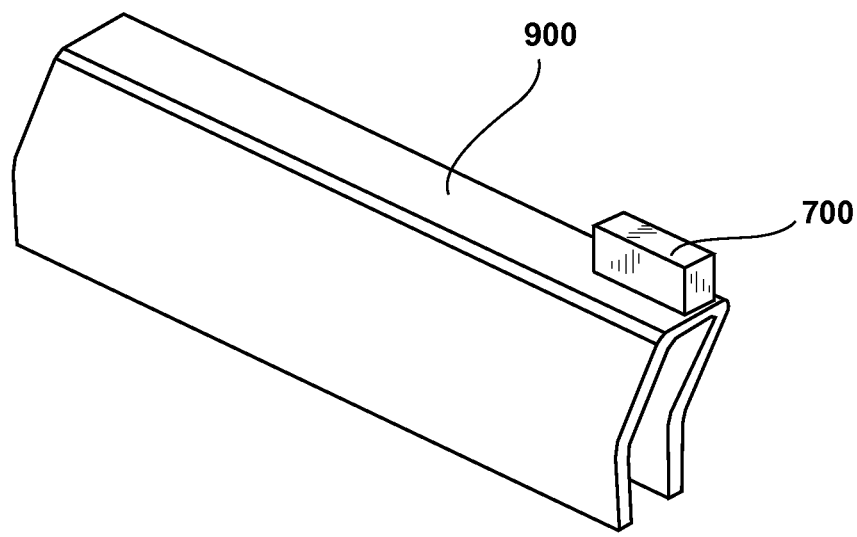
FIGS. 9 and 10 illustrate example dividers including or implementing respective ones of the example gap gauges of FIGS. 7 and 8.
Figure 10:
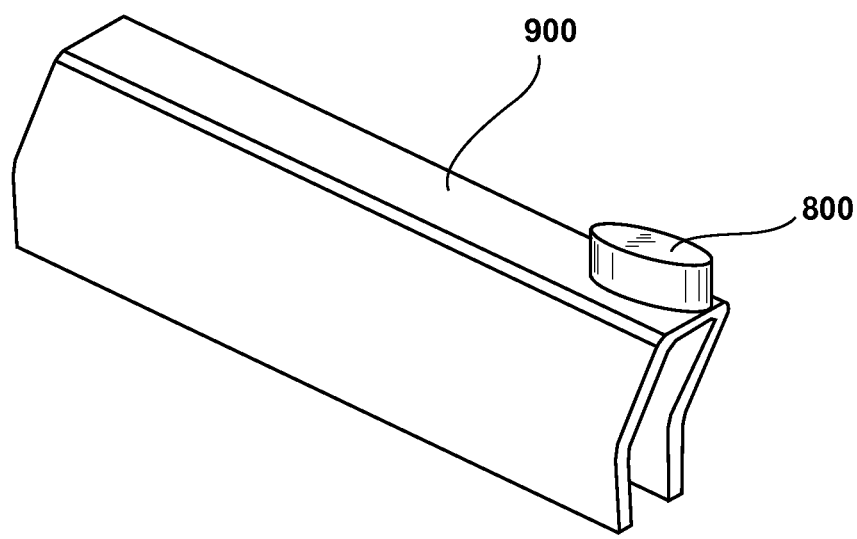

FIGS. 9 and 10 respectively show the rectangular gap gauge 700 and the oval gap gauge 800 extending from a divider 900, such as the example dividers 123 and 124 of FIG. 1. While a design of a particular divider 900 is shown in FIGS. 9 and 10, the example divider 900 may be any type, shape, design or size of divider suitable for use within a refrigerator, freezer of icemaker. The gap gauges 700, 800 may be located anywhere on the divider 900. An exemplary location shown in FIGS. 9 and 10 is at one end of a top surface of the divider 900.

Figure 11:
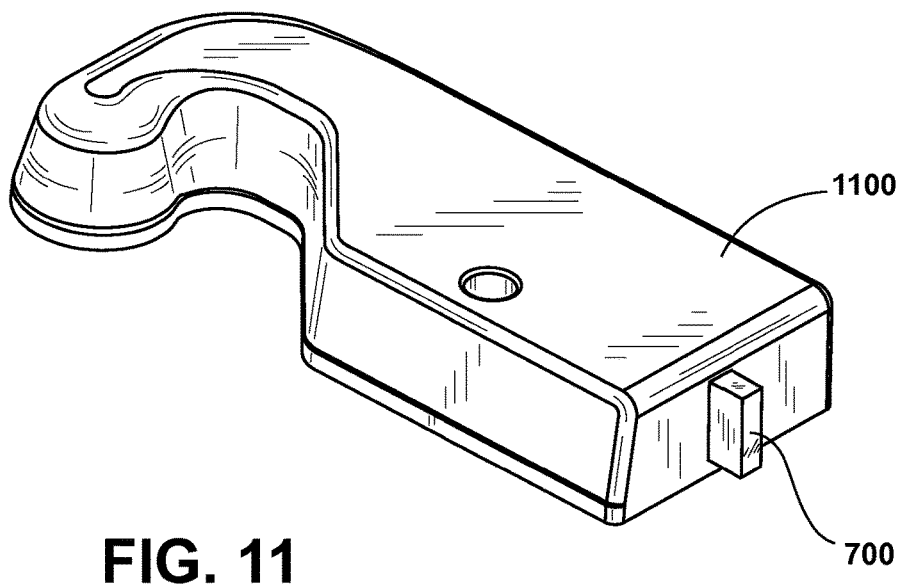
FIGS. 11 and 12 illustrate example hinge covers including or implementing respective ones of the example gap gauges of FIGS. 7 and 8.
Figure 12:
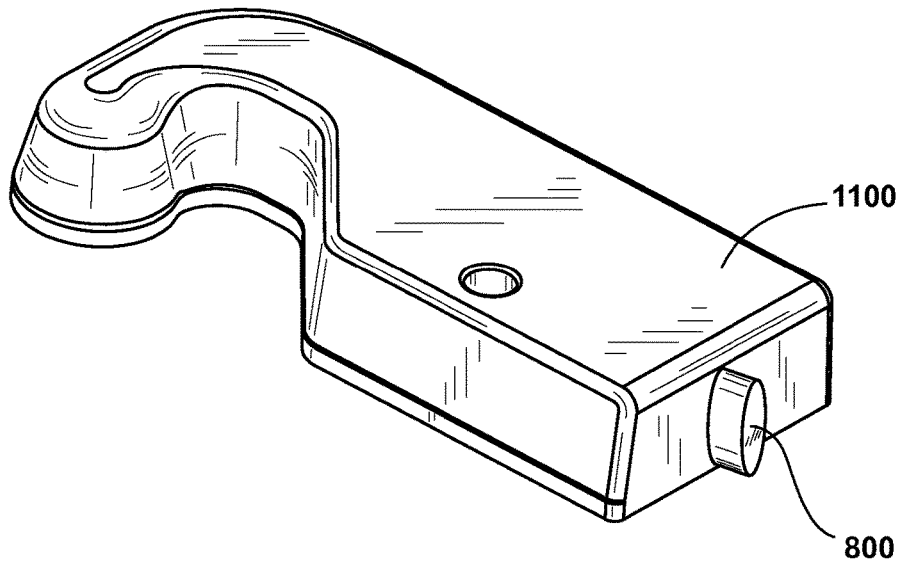
Figure 19:
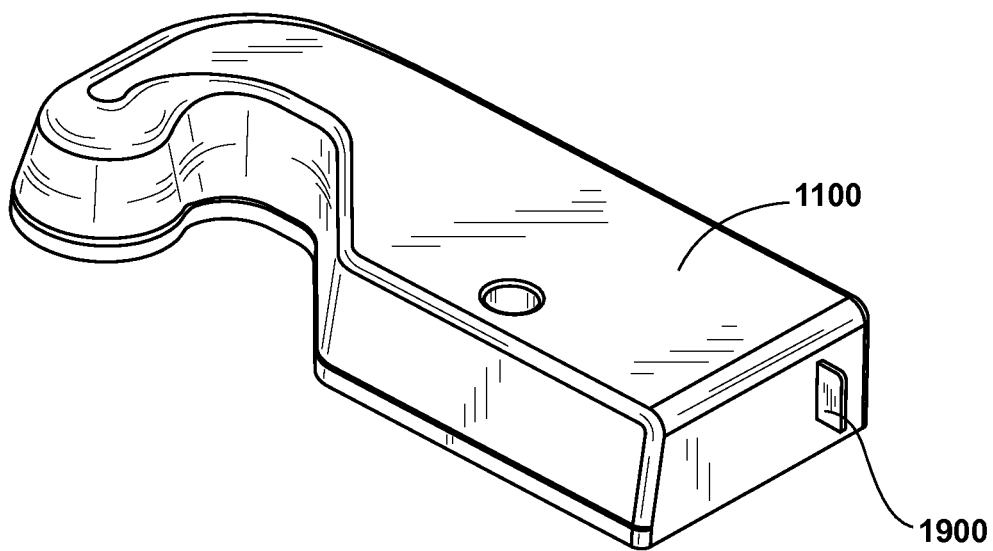
FIG. 19 illustrates an example hinge cover including or implementing a blade-shaped gap gauge such as that shown in FIG. 18S.

FIGS. 11 and 12 respectively show the rectangular gap gauge 700 and the oval gap gauge 800 extending from a hinge cover 1100, such as the example hinge cover 128 of FIG. 2. FIG. 19 shows a blade-shaped gap gauge 1900 extending from the hinge cover 1100, such as the example hinge cover 128 of FIG. 2. While a design of a particular hinge cover is shown in FIGS. 11 and 12, the hinge cover 1100 may be any type, shape, design or size of hinge cover suitable for use on a refrigerator, freezer or icemaker. The gap gauges 700, 800, 1900 may be located anywhere on the hinge cover 1100. Exemplary locations shown in FIGS. 11, 12 and 19 are on a back end or surface of the hinge cover 1100.

Figure 13:
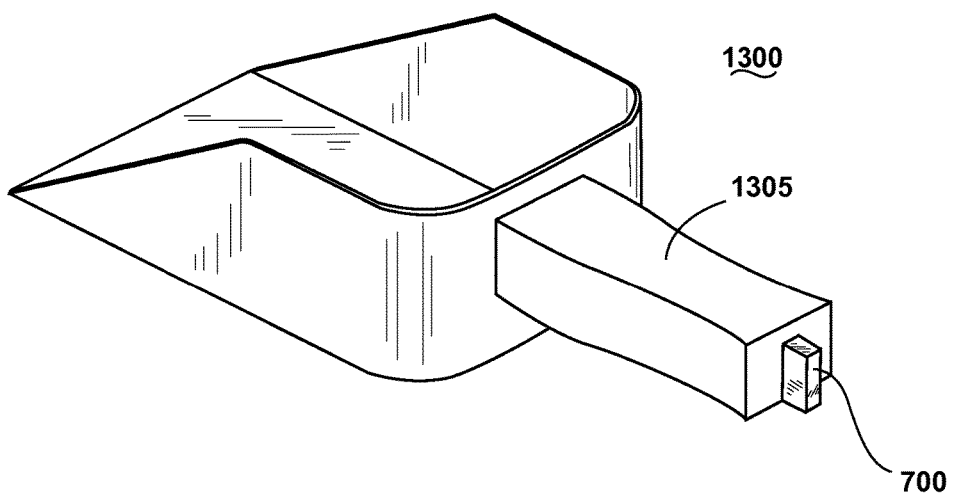
FIGS. 13 and 14 illustrate example scoops including or implementing respective ones of the example gap gauges of FIGS. 7 and 8.
Figure 14:
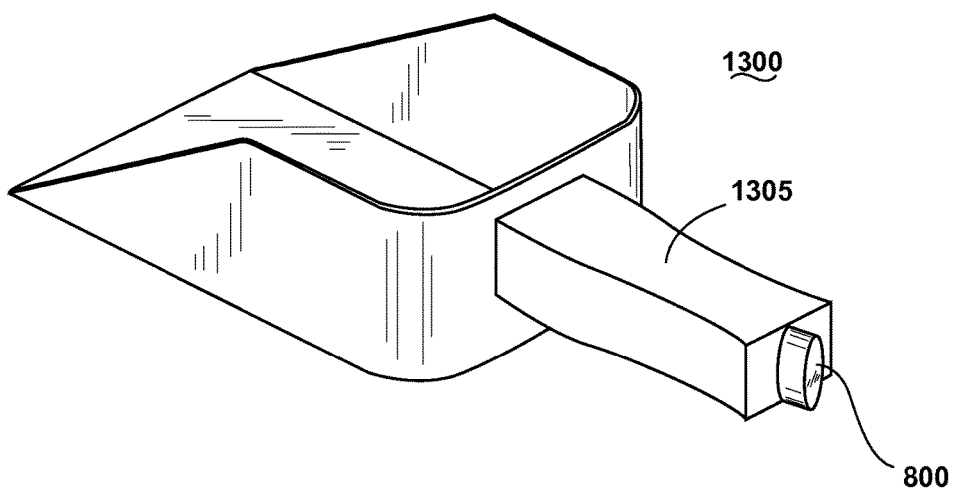

FIGS. 13 and 14 respectively show the rectangular gap gauge 700 and the oval gap gauge 800 extending from the end of the handle 1305 of a scoop 1300, such as an ice scoop. While a design of a particular ice scoop is shown in FIGS. 13 and 14, the example scoop 1300 of FIGS. 13 and 14 may be any type, shape, design or size of scoop suitable for use with a refrigerator, freezer or icemaker. The gap gauges 700, 800 may be located anywhere on the scoop 1300. An exemplary location shown in FIGS. 13 and 14 is on the end of the handle 1305 of the scoop 1300.

FIGS. 15-17 respectively show a perspective view, a side cross-section view taken along line XVI-XVI of FIG. 15, and a top cross-section view taken along line XVII-XVII of FIG. 15 of the example rectangular gap gauge 700 on the example scoop handle 1305, as shown in FIG. 13. As shown, the gap gauge 700 has two cross-section dimensions 1605 and 1705 that may be used to align gaps of separation distances corresponding to the dimensions 1605 and 1705. It will be appreciated that the example oval gap gauge 800 could have identical cross-section dimensions 1605 and 1705. Accordingly, choice of the rectangular gap gauge 700, the oval gap gauge 800 or some other shape can be made based on preference, decorative, ornamental and/or aesthetic reasons. In some examples, the length 1610 of the gap gauge 700 is selected so the gauge 700 can extend a desired distance into a gap. However, in other examples, beyond a minimum length, the length 1610 of the gap gauge 700 is selected for preferential, decorative, ornamental and/or aesthetic reasons.

FIGS. 18A-T illustrate exemplary geometric cross-sections that may be used to implement a gap gauge. It should be apparent that many other geometric cross-sections could be used. Different ones of the example cross-sections of FIGS. 18A-T may be used for different numbers of gap separations. Moreover, point-to-point, point-to-flat, and flat-to-flat dimensions may be used as gap gauge dimensions. For example, the rhombus of FIG. 18F may be used to implement 4 different gap spaces, the trapezoid of FIG. 18H can be used to implement 3 different gap spaces, etc.

Figure 20:
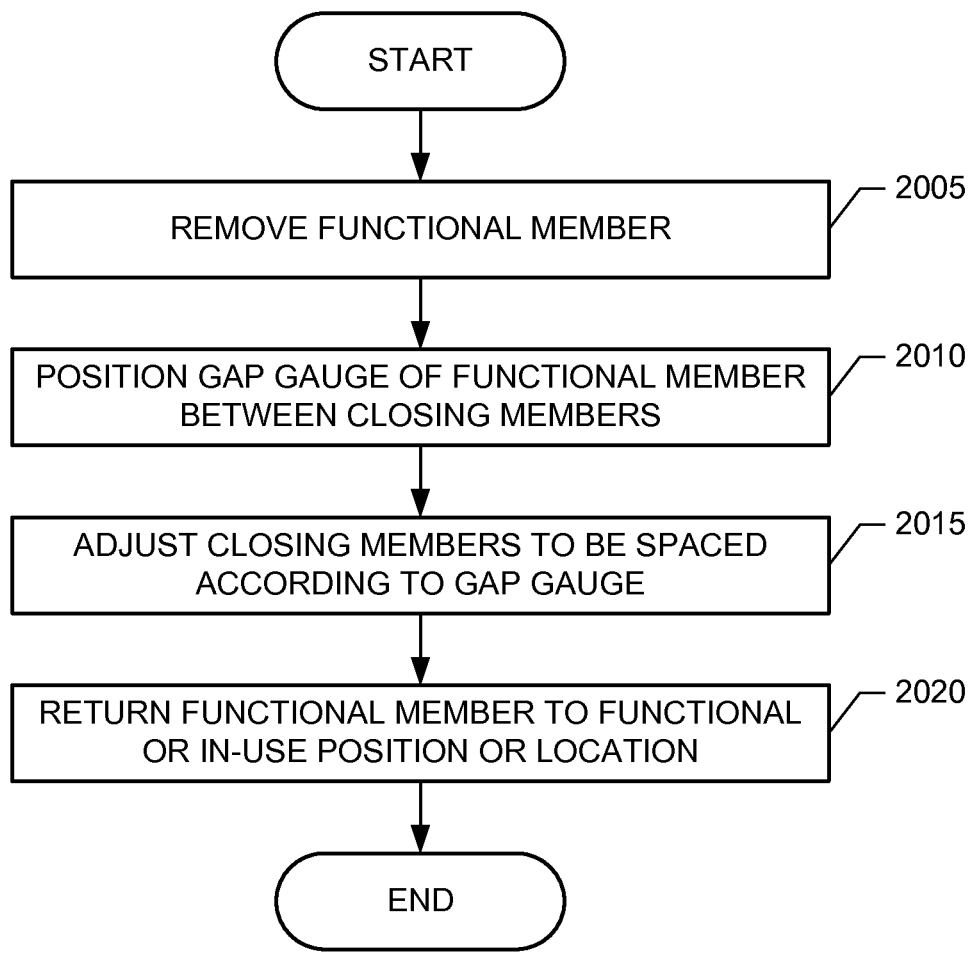
FIG. 20 is a flow chart illustrating an example method of using a functional member having a gap gauge to align closing members of refrigerator, freezer or icemaker.

FIG. 20 is a flow chart illustrating an example method of using a functional member having a gap gauge, such as those disclosed herein, to align closing members of refrigerator, freezer or icemaker. In the example method of FIG. 20, a functional member having a gap gauge is removed from its functional and/or in-use position and/or location (block 2005). For example, a divider may be removed from a drawer or bin, a hinge cover may be unscrewed from its position above a hinge, a scoop may be removed from an ice bin, etc. The gap gauge of the removed functional member is positioned between the closing members to be aligned (block 2010). If their current spacing is less than the dimension of the gap gauge the closing members need to be initially adjusted so the gap gauge can be positioned between them. The closing members are adjusted to be spaced according to a dimension of the gap gauge (block 2015), and the functional member can then be returned to its original in-use location and/or position (block 2020).

The use of the gap gauge, such as those disclosed herein, allows for the service person coming on a service all to an appliance owner's home or the homeowner himself/herself to use the appropriate gap gauge for making adjustments and for setting the gap between the closing members. The gap gauge can then be stored in an ongoing and readily available location as a component of the overall appliance. This helps ensure that the appropriate gap gauge is available for use at all times—even after the appliance has been initially set up.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A functional member of a refrigerator, freezer or icemaker having two closing members intended to be separated by a first distance, the functional member comprising:
   a structure to implement a function for the refrigerator, freezer or icemaker; and
   a gap gauge dimensioned for use in aligning the two closing members apart by the first distance.

2. A functional member as defined in claim 1, wherein the gap gauge extends from the structure.

3. A functional member as defined in claim 1, wherein the gap gauge comprises a dimension of a portion of the structure.

4. A functional member as defined in claim 1, wherein the gap gauge is further dimensioned for use in aligning one of the two closing members and a third closing member, or two additional closing members apart by a second different distance.

5. A functional member as defined in claim 4, wherein the functional member comprises a divider, a hinge cover or a scoop, and the gap gauge has a rectangular or an oval cross-section, wherein the cross-section has a first dimension in a first direction corresponding to the first distance, and a second dimension in a second different dimension corresponding to the second distance.

6. A functional member as defined in claim 1, wherein the functional member comprises a divider.

7. A functional member as defined in claim 6, wherein the gap gauge has a rectangular or an oval cross-section, wherein a dimension of the cross-section is the first distance.

8. A functional member as defined in claim 6, wherein the gap gauge has a structure having a dimension corresponding to the first distance.

9. A functional member as defined in claim 1, wherein the functional member comprises a scoop.

10. A functional member as defined in claim 9, wherein the gap gauge has a rectangular or oval cross-section, wherein a dimension of the cross-section is the first distance.

11. A functional member as defined in claim 9, wherein the gap gauge has a structure having a dimension corresponding to the first distance.

12. A functional member as defined in claim 1, wherein the functional member comprises a hinge cover.

13. A functional member as defined in claim 12, wherein the gap gauge has a rectangular, an oval, or a circular cross-section, wherein a dimension of the cross-section is the first distance.

14. A functional member as defined in claim 12, wherein the gap gauge has a blade-shaped cross-section, wherein a dimension of the cross-section is the first distance.

15. A functional member as defined in claim 1, wherein the function comprises at least one of a covering function, a holding function, a dividing function, a supporting function, and/or a decorative function.

16. A functional member as defined in claim 1, wherein the gap gauge has an ornamental or decorative shape.

17. A functional member as defined in claim 16, wherein the shape comprises a cross-section corresponding to a rectangle, a blade-shaped, a cross, a circle, an oval, an ellipse, a crescent, a curvilinear triangle, a quatrefoil, a parallelogram, a square, a trapezoid, a trapezium, a triangle, a kite, a rhombus, a pentagon, a hexagon, a heptagon, an octagon, a nonagon, or a decagon cross-section.

18. A functional member as defined in claim 1, wherein the functional member comprises at least one of a toe kick, a handle, a shelf mount, a dispenser drip trap, a water filter, a liner, a mat, a door, and/or an air filter.

19. A functional member as defined in claim 1, wherein a dimension of the gap gauge is the first distance.

20. A method of aligning two closing members of a refrigerator, freezer or icemaker to be separated by a first distance, the method comprising:
   removing a functional member from the refrigerator, freezer or icemaker;
   positioning a gap gauge portion of the functional member between the closing members;
   adjusting the alignment of the closing members according to the gap gauge portion positioned between the closing members; and
   returning the functional member to the refrigerator, freezer or icemaker.

* * * * *